United States Patent [19]
Kremser

[11] Patent Number: 5,636,936
[45] Date of Patent: Jun. 10, 1997

[54] CONNECTOR ASSEMBLY FOR JOINING STRUCTURAL MEMBERS

[76] Inventor: Kurt Kremser, Saseler Chaussee 150, 22393 Hamburg, Germany

[21] Appl. No.: 194,176

[22] Filed: Feb. 9, 1994

[30] Foreign Application Priority Data

Feb. 10, 1993 [EP] European Pat. Off. ............. 93102021

[51] Int. Cl.[6] .................................................... F16B 12/10
[52] U.S. Cl. ......................... 403/282; 403/295; 403/387; 403/401; 403/403; 52/586.2
[58] Field of Search ........................... 403/282, 279, 403/274, 205, 403, 401–402, 294, 298, 305, 314, 384, 387, 231, 284, 285, 277, 363; 52/272, 586.1, 586.2, 409, 204.62, 204.7, 90.1, 201, 585.1

[56] References Cited

U.S. PATENT DOCUMENTS

| | | | |
|---|---|---|---|
| 2,861,659 | 11/1958 | Hagerty et al. | 403/285 X |
| 3,040,847 | 6/1962 | Webster | 52/204.7 X |
| 3,160,249 | 12/1964 | Pavlecka | 52/586.2 |
| 3,214,802 | 11/1965 | Davis | 403/298 X |
| 4,103,465 | 8/1978 | McDonald, Jr. | 52/475.1 X |
| 4,655,019 | 4/1987 | Rejc | 52/239 X |
| 4,831,804 | 5/1989 | Sayer | 52/475.1 |
| 4,953,338 | 9/1990 | Wilson et al. | 52/586.2 |
| 5,155,960 | 10/1992 | Shaanan | 52/238.1 X |
| 5,211,502 | 5/1993 | Upham-Hill | 403/254 X |
| 5,378,077 | 1/1995 | Paulsen | 403/402 |

*Primary Examiner*—Harry C. Kim
*Attorney, Agent, or Firm*—Henry M. Feiereisen

[57] ABSTRACT

A connector assembly for joining two structural members arranged in longitudinal direction sequentially or side-by-side, includes at least one structural member which has a hollow space enclosed all-round by an outer wall and which has a receptacle adjoining the outer wall for receiving a rim of a flat object. At least one single-piece connector is lockingly fitted in the structural members through deformation of the structural members for securely joining the latter. Suitably, the structural elements have opposing receptacles when arranged parallel side-by-side for receiving a connector in form of a massive, preferably parallelepiped metal block. Each receptacle is of U-shaped configuration, with opposing longitudinal sides and a base extending between the longitudinal sides, with the base and one longitudinal side being formed by a wall section and with the other longitudinal side being formed by a cantilevered shank connected to the base.

29 Claims, 12 Drawing Sheets

CONNECTOR ASSEMBLY FOR JOINING STRUCTURAL MEMBERS

BACKGROUND OF THE INVENTION

The present invention generally refers to the field of connections for support structures and in particular to a connector assembly for joining hollow structural frame members arranged sequentially or side-by-side, with at least one structural member having an outer wall completely surrounding a hollow space, wherein at least one of the wall sections of the outer wall includes a receptacle for receiving the rim or edge of a flat object.

In general, structural members of this type are characterized by a high section modulus and are used for making canopy constructions as support for large glass panels or plastic panels which engage with their rim in the receptacle of the structural member. Since more elegant roof constructions include glass panels or plastic panels which are frequently bent at least once and/or are abut each other at varying angles, it is necessary to make the frame for the glass panels or plastic panels in a manner that the structural members can be arranged sequentially as well as side by side at different angles relative to each other.

SUMMARY OF THE INVENTION

It is an object of the present invention to provide an improved connector assembly which includes only a few and simple connecting elements for joining structural elements, without creating an open connection between the longitudinal outside surfaces and the hollow space of the structural member and without visibility of the connecting elements while still ensuring a long lasting support.

This object and others which will become apparent hereinafter are attained in accordance with the present invention by providing at least one single-piece connector with opposing ends for engagement into the structural members being joined, with the connector being lockingly fitted in the structural members through deformation of the structural members.

In accordance with a first embodiment of the present invention suitable for joining two structural members arranged side by side in direction of the longitudinal axis, the structural members are positioned such that a receptacle of one structural member opposes a receptacle of the other structural member to define an enclosed space in which a connector made in form of a massive parallelepiped block of metal, preferably aluminum, is lockingly fitted by slightly expanding the area of the engagement.

Preferably, the receptacle of each structural members is of U-shaped configuration having opposing longitudinal sides connected by a base, with one of the longitudinal sides and the base being formed by a section of the outer wall and the other longitudinal side being formed by a cantilevered shank which is connected to the base. When pressing the connector into the receptacles, the cantilevered shank is slightly warped or bent so as to bear upon the connector under a certain bending stress. Suitably, at least one of the opposing inside surfaces of the U-shaped receptacles is provided with a serration which extends parallel to the longitudinal axis of the receptacle.

In accordance with a variation of the present invention, the cantilevered shank of the receptacle of one structural member is extended in direction of the cantilevered shank of the receptacle of another structural member so as to at least partly overlap the cantilevered shank of the receptacle of the other structural member from outside. Such support structures are especially useful in those cases in which the cantilevered shank of the U-shaped receptacle is extended to form a unilaterally open, closable trough which serves as wall mounting or post for supporting a gutter or a drain pipe or to support lighting fixtures.

In accordance with another variation of the present invention which is useful for joining sequentially arranged structural members, the hollow spaces of structural members are engaged from their abutting end faces by a connector by which at least one adjoining wall section in the hollow spaces is deformed so as to be lockingly fitted therein, Preferably, the connector includes at least one recess or aperture to allow a wall section of the hollow space to be impressed from outside and forced into the aperture for securing the connector. Suitably, a plurality of such apertures is provided in an area of the connector between two opposite outer wall sections, with at least one of the wall sections bounding a receptacle. By embossing the wall section in the area of a receptacle, the impressions become invisible from outside after connecting the structural members and inserting the glass panel or plastic panel into the receptacles.

Suitably, the outer wall is pressed into the apertures only to such a degree that an all-round closed outer wall is maintained to prevent moisture from penetrating into the interior of the hollow space.

BRIEF DESCRIPTION OF THE DRAWINGS

The above objects, features and advantages of the present invention will now be described in more detail with reference to the attached drawing in which.

DETAILED DESCRIPTION OF PREFERRED EMBODIMENTS

The following description of the present invention discloses embodiments which are merely exemplary of the present invention and which may be embodied in various forms. Specific structural and functional details disclosed herein are not to be interpreted as limiting, but merely as a teaching for one skilled in the art to variously employ the present invention in any suitable structure.

Throughout all the Figures, the same or corresponding elements are always indicated by the same reference numerals.

Figure 1:
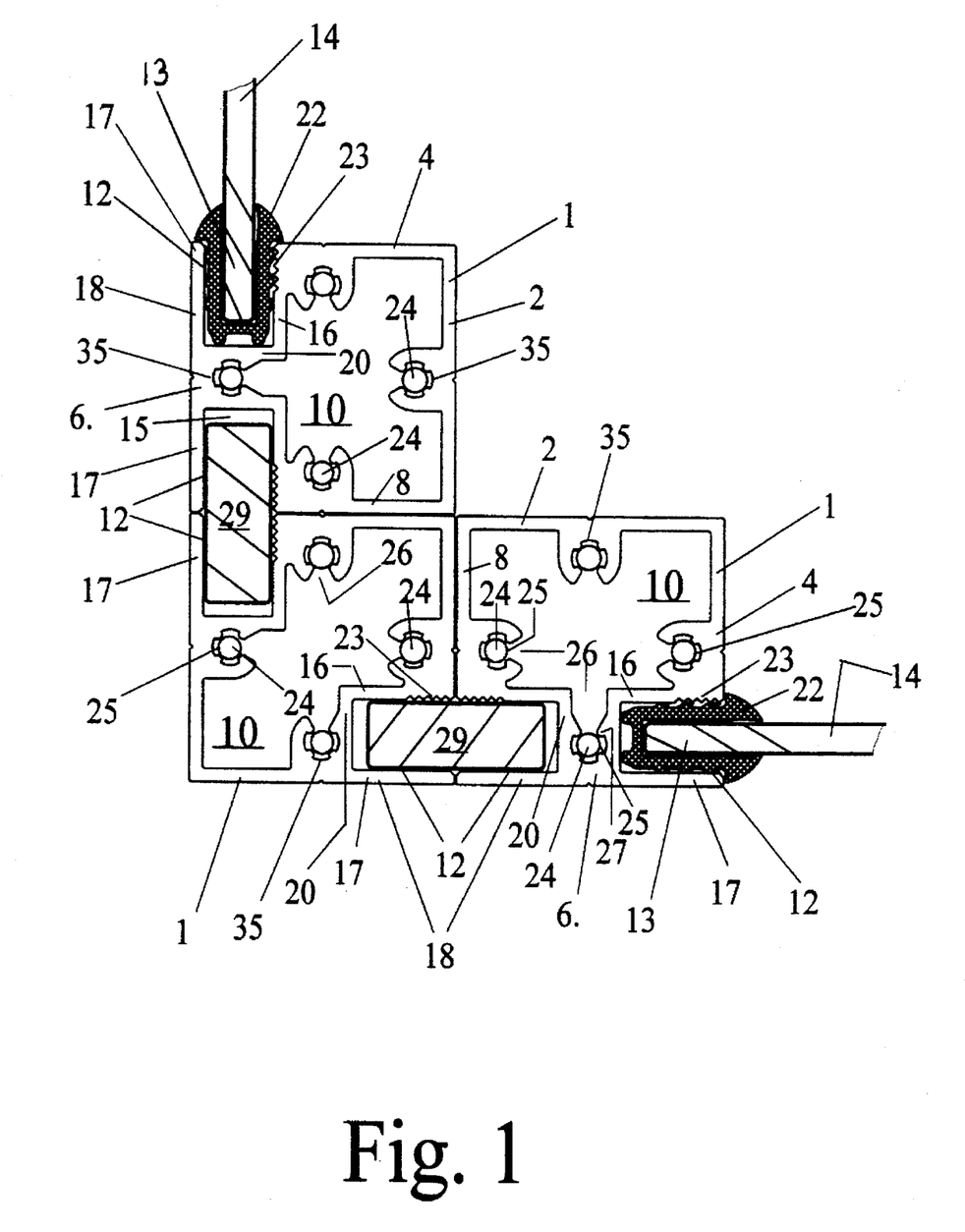
FIG. 1 is a partially cross-sectional view of a connector assembly in form of an exemplified corner structure, with three structural members according to the invention, placed side-by-side and joined together.

Referring now to the drawing and in particular to FIG. 1, there is shown a corner structure which includes three hollow, tubular structural members of substantially square configuration, generally designated by reference numeral 1. The structural elements 1 are placed in parallel and side-by-side arrangement to each other, with each structural member 1 having an outer wall comprised of wall sections 2, 4, 6, 8 to enclose all-round a hollow space 10, and at least one receptacle 12 for supporting the rim or border edge 13 of an exemplified glass panel or plastic panel 14.

In the exemplified corner structure of FIG. 1, two structural members 1 with receptacles 12 in side-by-side arrangement in a common plane are joined together with a corner structural member 1 having two receptacles 12 extending vertically to each other. Each receptacle 12 is of U-shaped configuration with two longitudinal sides 16, 17 and a base 20 extending between the longitudinal sides 16, 17. The base 20 and the longitudinal side 16 which adjoins the hollow space 10 are formed by the wall section 6 of the structural member 1 while the opposite longitudinal side 17 is formed by a free or cantilevered shank 18 connected integrally with the base 20. Before fitting the glass panel or plastic panel 14 into the respective receptacle 12, a rubber gasket 22 is suitably placed around the rim of the panel 14 to ensure a secure fit of the panel 14 within the receptacle 12. In order to prevent a displacement of the rubber gasket 22 in the receptacle 12, the longitudinal side 16 is provided along the inside surface facing the panel 14 in an area adjoining the wall section 4 with a serration 23 which extends parallel to the longitudinal axis of the structural member 1 and cooperates with a complementary serration of the rubber gasket 22.

Extending inwardly from the wall sections 2, 4, 8 and between the bases 20 are projections 27 which protrude toward the hollow space 10 and define a total of four receiving chambers 24 which extend parallel in direction of the longitudinal axis of the structural member 1, with two chambers 24 respectively opposing each other. The chambers 24 are of substantially cross-shaped configuration to define three channels 25 and a channel 26 which opens towards the hollow space 10. The corner structural member 1 is essentially of same configuration with four receiving chambers 24 extending inwardly from the respective wall sections 2, 4, 6, 8.

Figure 2:
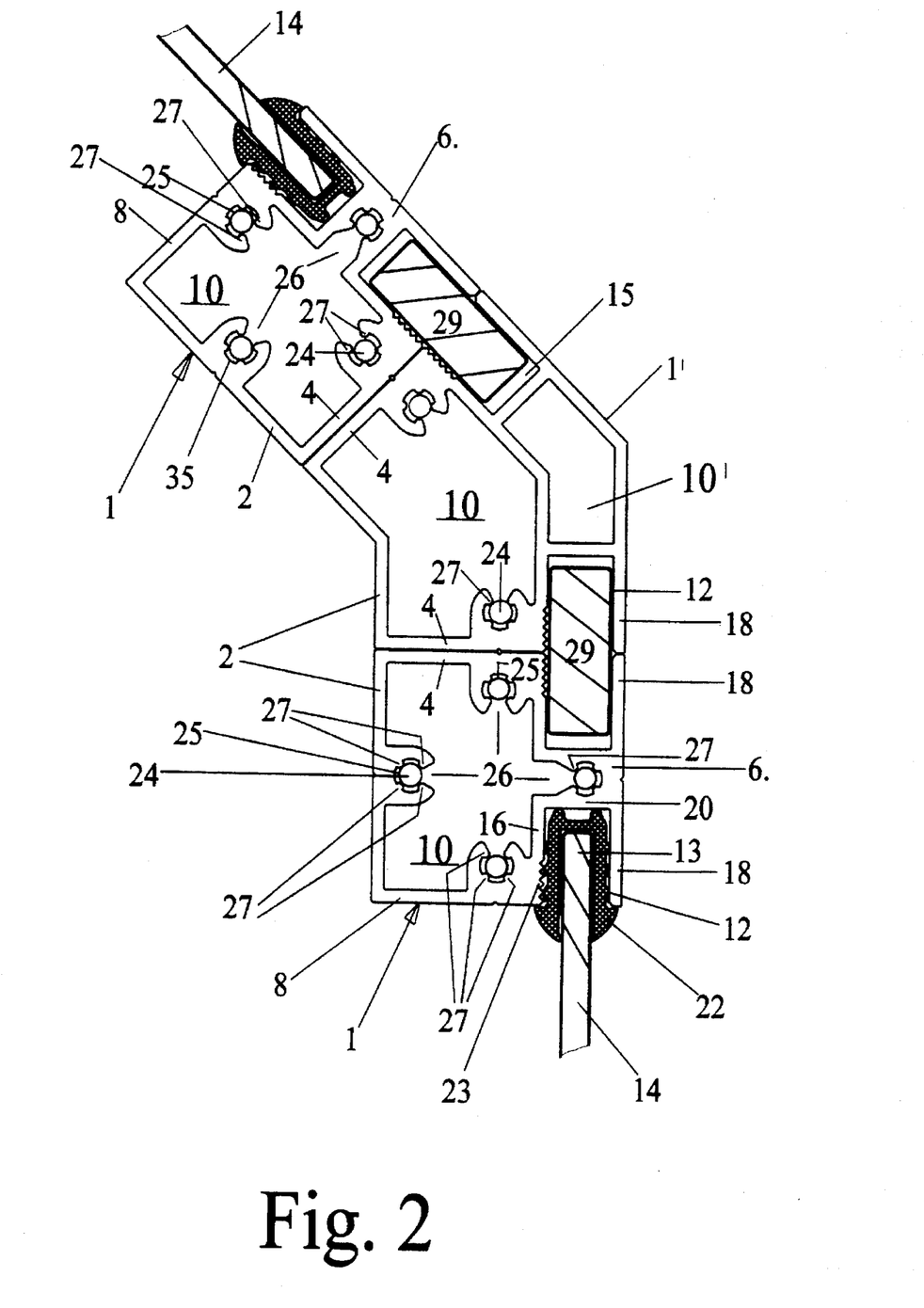
FIG. 2 is a partially cross-sectional view of a connector assembly in form of an exemplified ridge structure, with three structural members according to the invention, placed side-by-side and joined together.

Turning now to FIG. 2, there is shown a partially cross-sectional view of an exemplified ridge structure, with a structural member 1' of polygonal cross section arranged in side-by-side arrangement between two structural members 1. The structural member 1' is provided with two receiving chambers 24 extending inwardly from opposing wall sections 4 into the hollow space 10.

Figure 3:
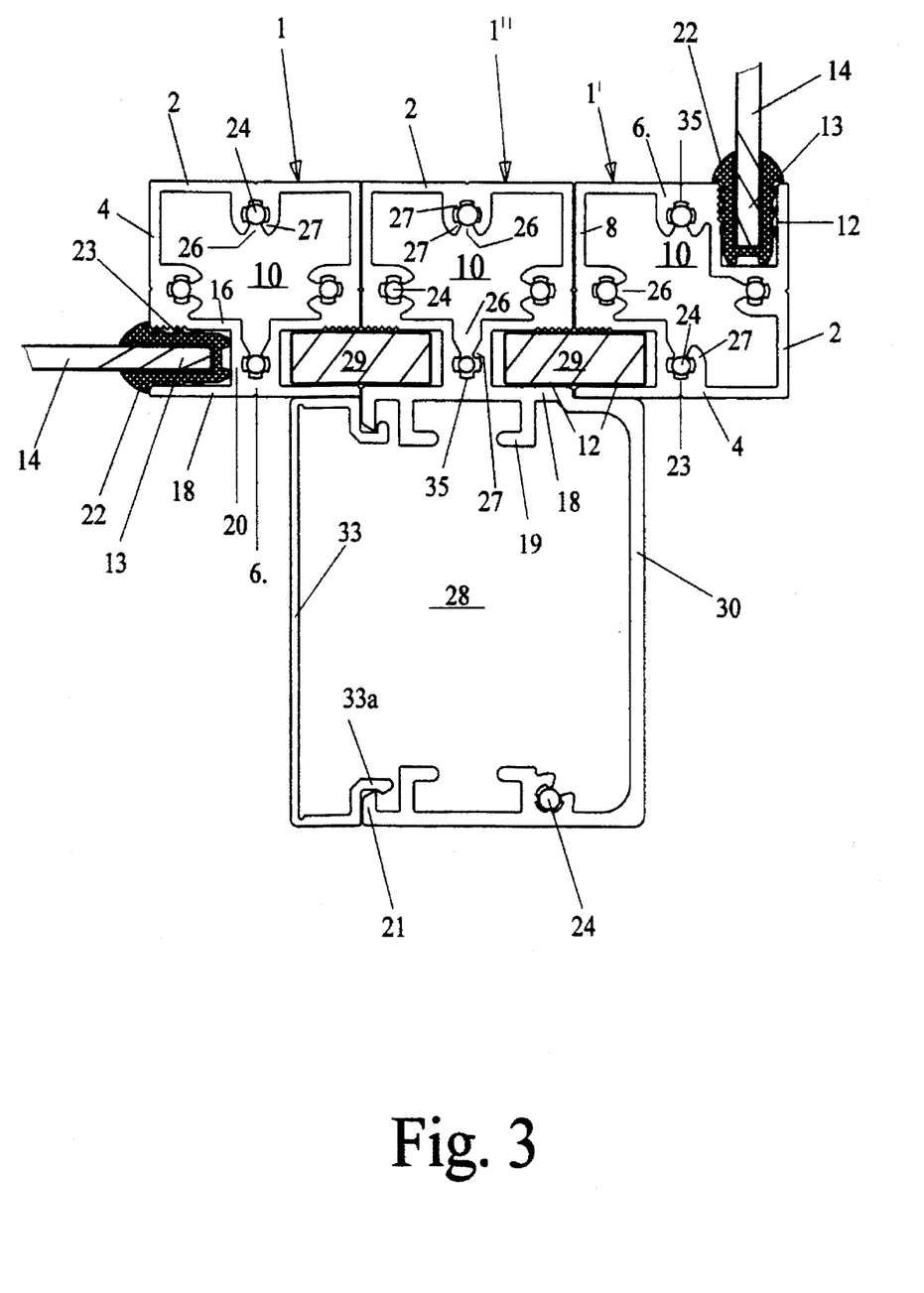
FIG. 3 is a partially cross-sectional view of a connector assembly including three structural members according to the invention, arranged parallel next to each other for support of a trough structure.

FIG. 3 shows a partially cross-sectional view of a trough-like support structure for use as a drain for rain water, including a structural member 1" between two structural members 1, one of which being a corner structural member 1. The structural member 1" supports a trough structure 30 which is open at one side for closure by a cover 33 which latches with a locking pawl 33a behind a lip 21 of the trough 30. The trough 30 may be pad of a drain for drainage of rain water and is integrally connected with the cantilevered shank 18 of the structural member 1". In this manner, the cantilevered shank 18 of structural element 1" is extended to partly overlap the opposing cantilevered shank 18 of the adjoining structural member 1 (the corner member in the example of FIG. 3).

The trough 30 is provided with opposing guides in form of T-slots 19 for support of various elements, with a receiving chamber 24 being placed adjacent to the lower T-slot 19. The provision of the trough 30 increases the flexural resistance and the buckle resistance of the structural member 1" and may be used for housing supply lines, drain pipes or gutters, or lighting fixtures for indirect illumination or may serve as post or wall mountings.

For joining two or more structural members 1, 1', 1" arranged parallel next to each other, the structural members 1, 1', 1" are positioned in such a manner that two receptacles 12 oppose each other with facing openings and with the ends of the cantilevered shanks 18 abutting each other so that opposing receptacles 12 form together a confined hollow space 15 which is invisible from outside, as shown in FIGS. 1 to 3. Inserted in this hollow space 15 are one or more connectors 29, distributed over the entire length of the structural member 1, 1', 1". Each connector is made in form of a massive parallelepiped metal block of sufficient dimensions to effect a slight bending and elastic deformation of the cantilevered shank 18 during insertion of the connector 29 into the receptacle 12 so that the connector 29 is pressed by the cantilevered shank 18 against the opposing longitudinal side 16 of the receptacle 12 and lockingly fitted therein. The serration 23 on the inside of the longitudinal side 16 is slightly pressed into the surface of the connector 29 so as to additionally improve the firmness of the connection.

When joining structural members 1, 1', 1" along a longitudinal side, the connector or connectors 29 are first pushed into a receptacle 12 of one structural member 1, 1', 1", with a portion of the connector 29 projecting outwards. Thereafter, the structural member 1, 1', 1" is attached to the other structural member 1, 1', 1" by forcing the jutting portion of the connector 29 into the opposing receptacle 12. The connector 29 becomes thus invisible from outside and ensures a permanent, secure and detachable connection between two structural members 1, 1', 1" arranged parallel side-by-side.

For joining structural members 1, 1', 1" arranged sequentially in longitudinal direction with abutting end faces, connectors 31 are used which are made of flat material, preferably steel sheet. Such connectors 31 are also used to provide corner connections as shown in FIGS. 4a to 4e, with intersecting structural members 1, 1', 1" having beveled or mitered portions 68 as shown by way of example in FIG. 6. The connectors 31 for allowing corner sections, as shown in FIG. 4a to 4e, have two shanks 32, 32' extending at an angle which corresponds to the angle at which the structural members 1, 1', 1" abut each other.

Figure 5A:
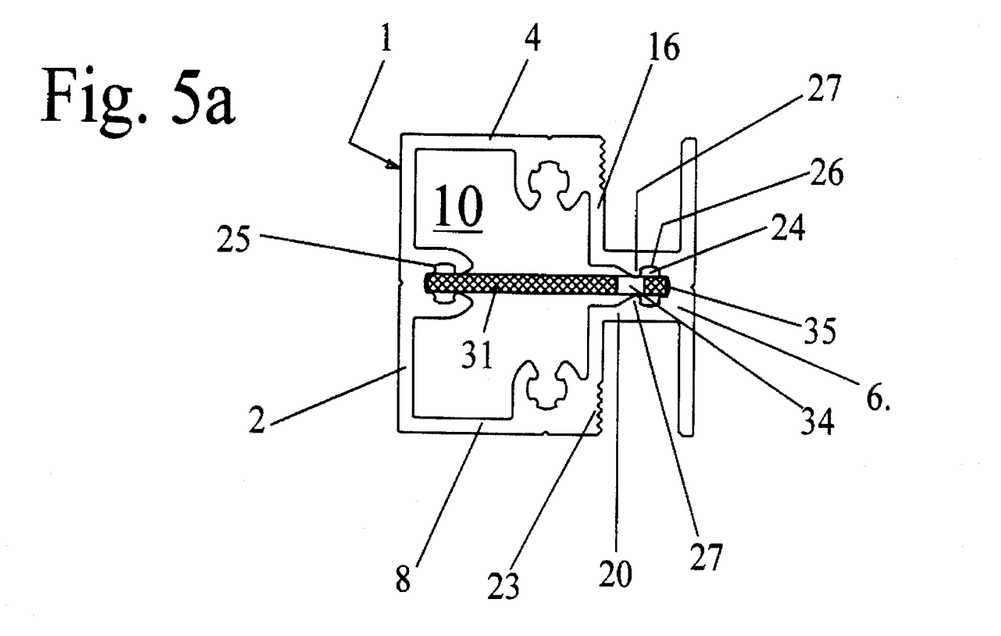
FIGS. 5a and 5b are cross sectional views through a structural member, illustrating a connector inserted from one end face into the hollow space of the structural member before and after effectuating the connection through impression.
Figure 5B:
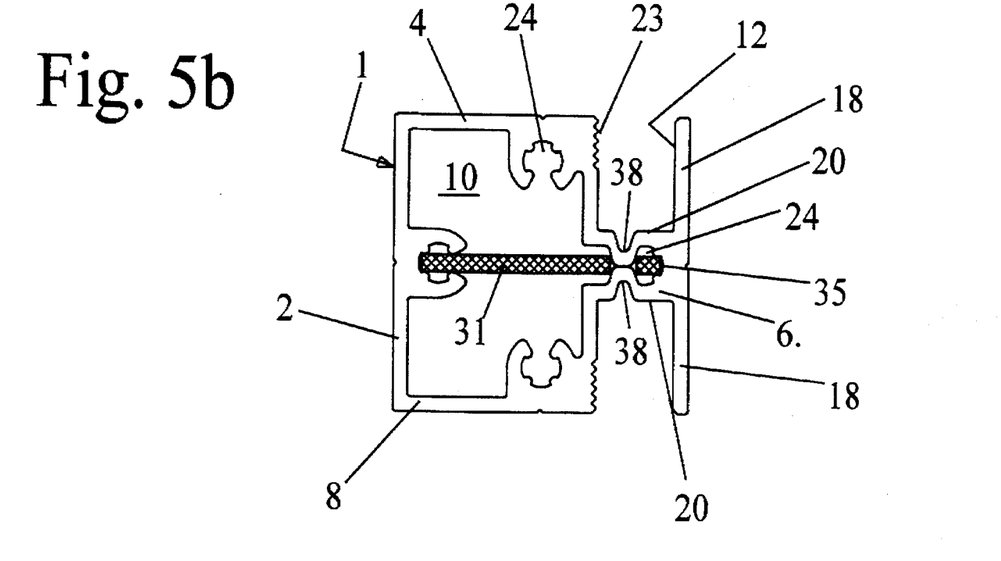
Figure 5C:
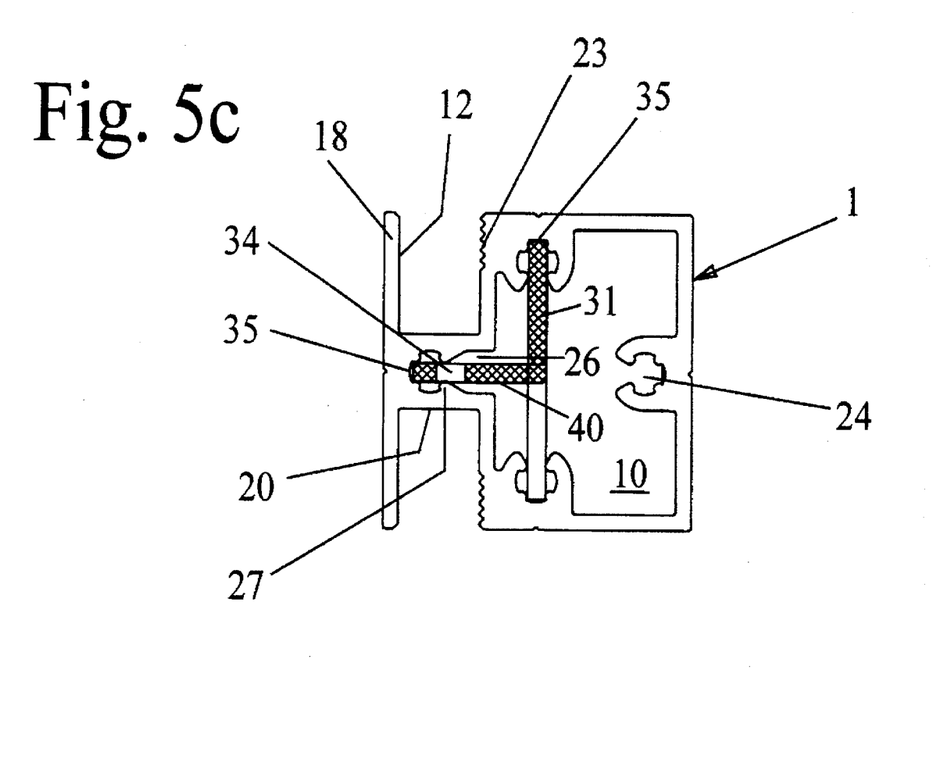
FIGS. 5c and 5d are cross-sectional views through a structural member, illustrating a modified connector inserted from one end face into the hollow space of the structural member before and after effectuating the connection through impression.

As best shown in FIGS. 5a and 5b, the width of the connectors 31 equals the distance between the outer boundary 35 of two opposing receiving chambers 24 while the thickness of the connectors 31 equals the inside width in channel 26 between opposing projections 27 and the inside width of the channels 25 in elongation of channel 26. This arrangement ensures a safe guidance of the connector 31 within the receiving chambers 24 of the structural members 1, 1', 1".

FIGS. 4a–4e show that each shank 32, 32' of the connectors 31 includes two circular apertures 34 which are spaced from a longitudinal side 36. These apertures 34 traverse the connector 31 and are provided to receive impressions 38 formed in the wall section of the structural member opposite to the aperture 34 from outside, as shown in FIGS. 5b and 5d. FIG. 5a shows the initial placement of the connector 31 in opposing receiving chambers 24, with the projections 27 and the channels 25 securely holding the connector 29 in place. The aperture 34 is still disengaged. Thereafter, the impressions 38, which are preferably provided in the area of the base 20 of the U-shaped receptacle 12 to render them invisible once a glass panel or plastic panel 14 is inserted are formed through pressing the wall section 6 inwardly into the aperture 34.

Figure 5D:
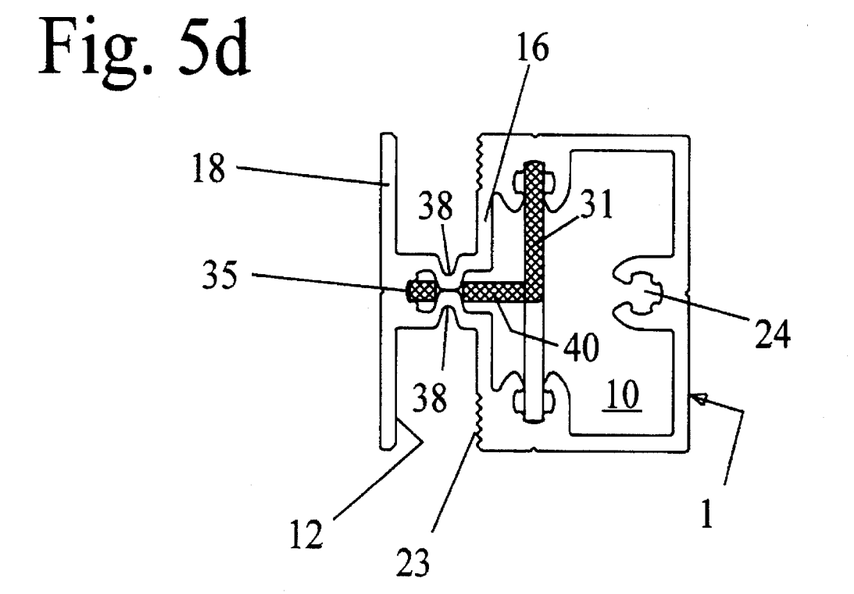
Figure 6:
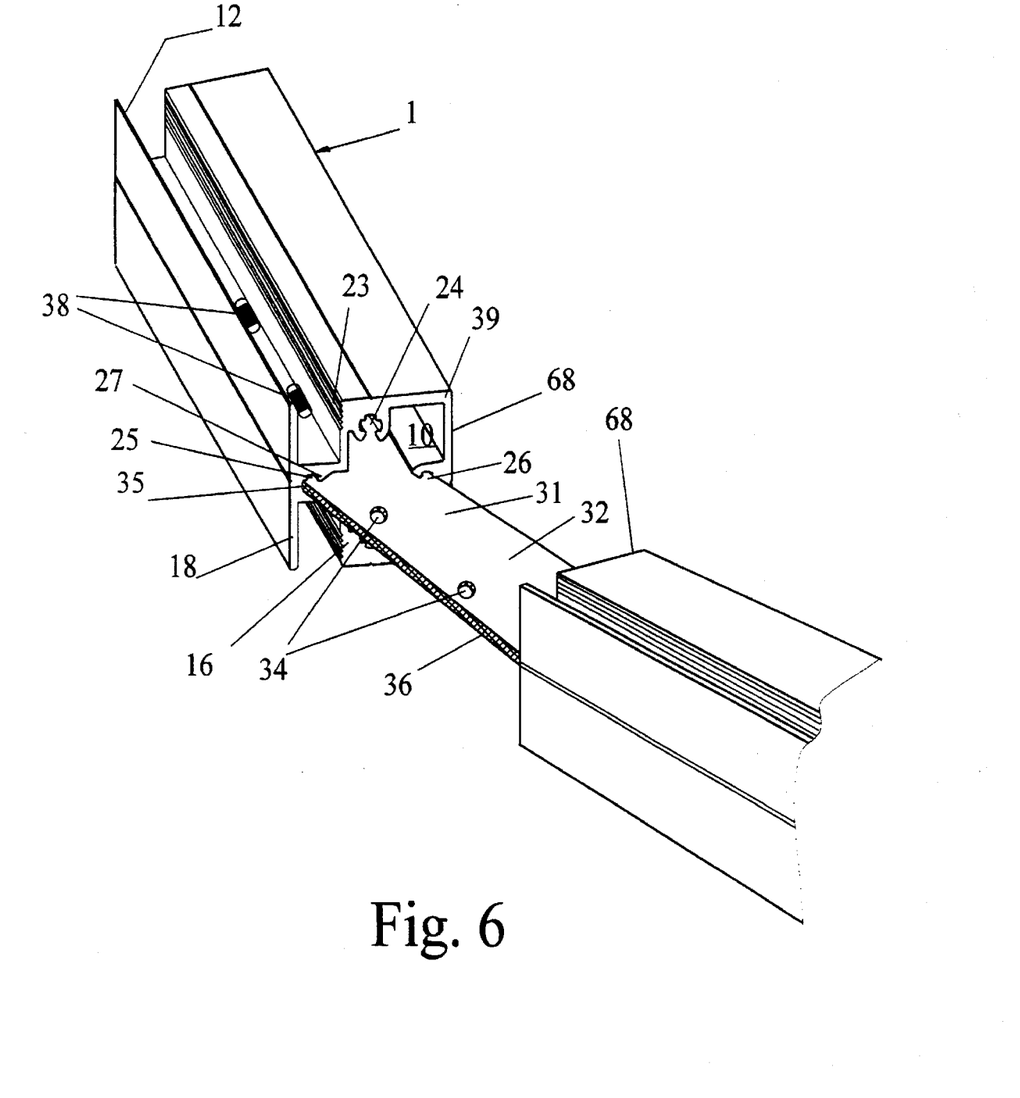
FIG. 6 is a perspective illustration of two structural members to be joined by an angled connector inserted from each end face into the hollow space of the structural members.

When connecting structural members 1 in a manner shown in FIG. 6, it is preferred to provide the receptacles 12 of each structural member 1, which face with their openings away from each other, with impressions 38 from opposing sides in each base 20 for engagement with the apertures 34 of the connector 31, as also shown in FIGS. 5b and 5d because a formation of impressions 38 from opposing sides enables application of embossing tools simultaneously from both sides so that one embossing tool serves as abutment for the other embossing tool. In this manner, a deformation of the structural member 1 outside the area of impression 38 is eliminated.

Figures 4A, 4B:
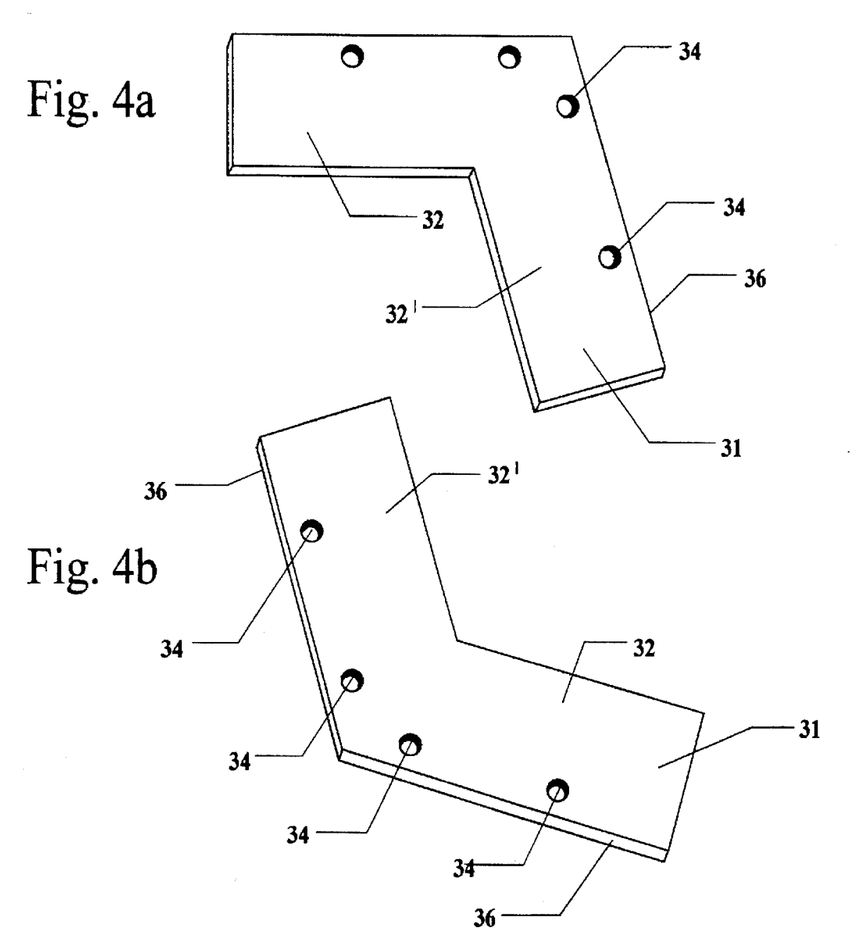
FIGS. 4a to 4e are perspective illustrations of various connectors as provided by the present invention for joining two structural members arranged sequentially and at an angle to each other.
Figure 4C:
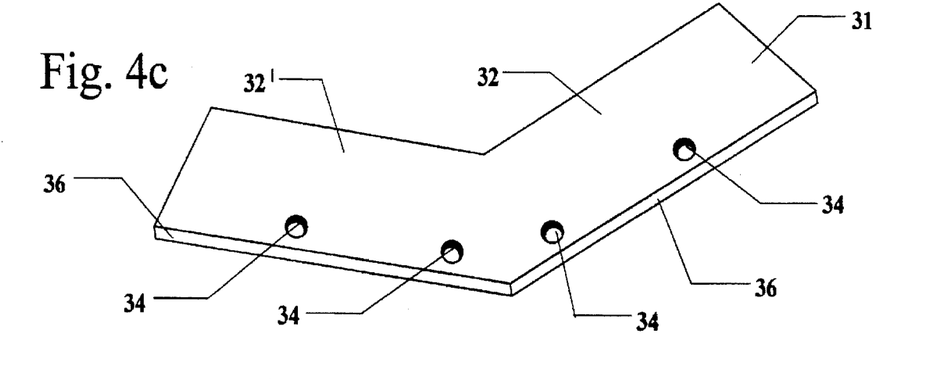

The connectors 31 as illustrated in FIGS. 4a to 4c are preferably used in joining mitered portions of structural members 1, with the bases 20 of the structural members 1 extending in a common plane while the glass panel or plastic panel 14 received in the respective receptacles 12 is placed perpendicular to the plane of the bases 20, as best seen in FIG. 6.

Figure 4D:
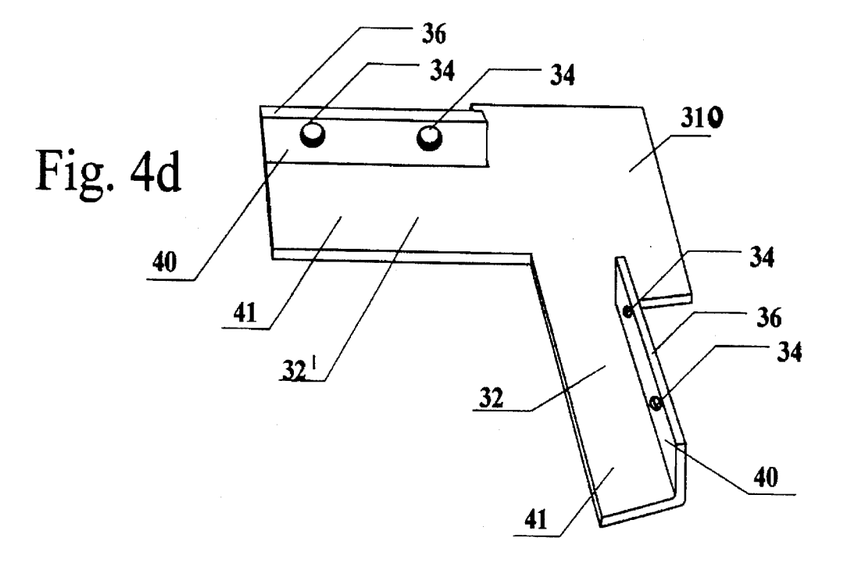
Figure 4E:
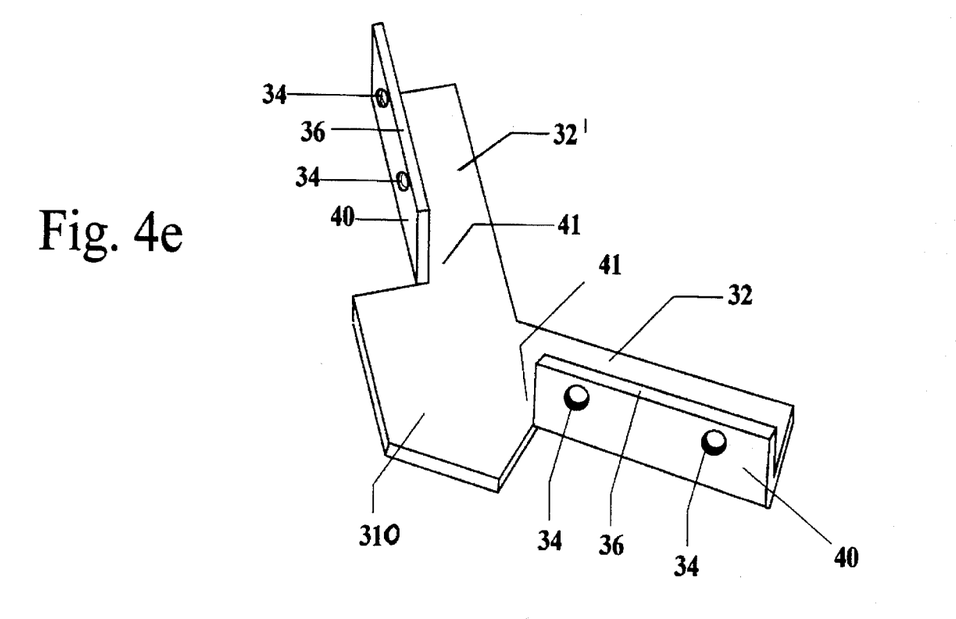

In those cases in which the bases 20 of structural members 1 being joined do not coincide in a common plane but are offset relative to each other, connectors 31 are used having shanks 32, 32' with portions 40 which are partly upwardly bent at a right angle in longitudinal direction of the shanks 32, 32', as shown in FIGS. 4d and 4e. The bent portion 40 of the shanks 32, 32' is provided with the apertures 34 and engages the receiving chamber 24 between two bases 20 of two receptacles 12 with openings facing away from each other so that the bases 20 can be embossed from both sides into the aperture 34 as shown in FIG. 5d at reference numeral 38. The straight portion 41 of the shank 32, 32' which extends parallel to the glass panel or plastic panel 14 engages the chamber 24 which is aligned with portion 41 (FIG. 5d).

The connector 31 is characterized by a significant flexural resistance. The bases 20 of the structural members 1 joined by the connectors 310 according to FIGS. 4d and 4e extend in planes which are inclined relative to each other at an angle given by the connector 310, in the example of FIGS. 4d and 4e at an angle of 90°, i.e. crosswise.

The impressions in each base 20 of the receptacles 12 are provided only to such a degree that no open connection is created between the outside of the structural member 1 and the hollow space 10 so as to avoid a penetration of e.g. rain water into the interior of the hollow space 10.

The impression 38 is provided in an area in which a projection 27 formed on the base 20 of the receptacle 12 separates the channel 26 which is open to the hollow space 10 from the neighboring channels 25. The projection 27 which inwardly protrudes toward the hollow space 10 is pressed during embossing into the aperture 34 to anchor the connector 31 within the chamber 24 (FIGS. 5a to 5d).

In order to sufficiently seal the gaps between end faces 39 (FIG. 6) of butt-joint structural members 1, it is advantageous to fill the hollow space 10 of the structural members 1 with a permanently elastic mass, such as silicon, prior to effectuating the connection so that a fraction of that mass will be displaced by the connector 31 during assembly of the structural members 1 to thereby fill the gaps between the end faces 39.

Figure 7:
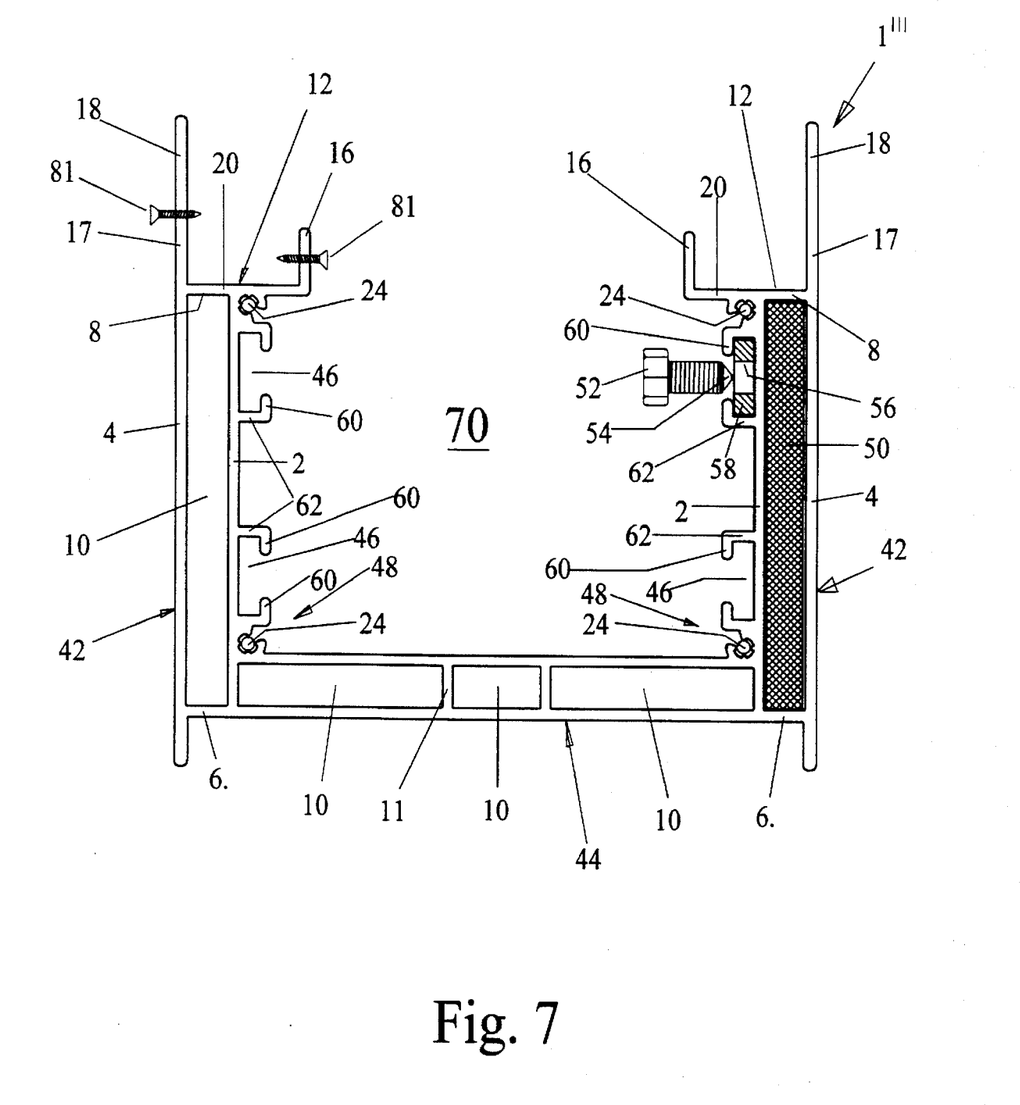
FIG. 7 is a partially cross-sectional view of another embodiment of a structural member according to the invention, with the structural member being of double-walled configuration to form a hollow space for engagement by a connector as provided by the present invention.

Turning now to FIG. 7, there is shown a partially cross-sectional view of another embodiment of a structural member 1''' according to the invention, with the structural member 1''' being of double-walled configuration to form a trough-like structure. The structural member 1''' has opposing side walls, generally designated by reference numeral 42 and a bottom wall, generally designated by reference numeral 44. Each side wall 42 is provided by spaced wall sections 2, 4 to define a single hollow space 10. The bottom wall 44 is also of double-walled construction and may encompass three hollow spaces 10 which are separated from each other by webs 11. The hollow spaces 10 in the side walls 42 are closed at the top by wall sections 8 which at the same time form the base 20 of respective receptacles 12 for receiving e.g. the rim 13 of a support structure formed by structural members 1 used as bordering of a glass panel or plastic panel 14.

The receptacles 12 are essentially of U-shaped configuration, with the inner opposing longitudinal sides 16 being shorter than the outer longitudinal sides 17.

Figure 8:
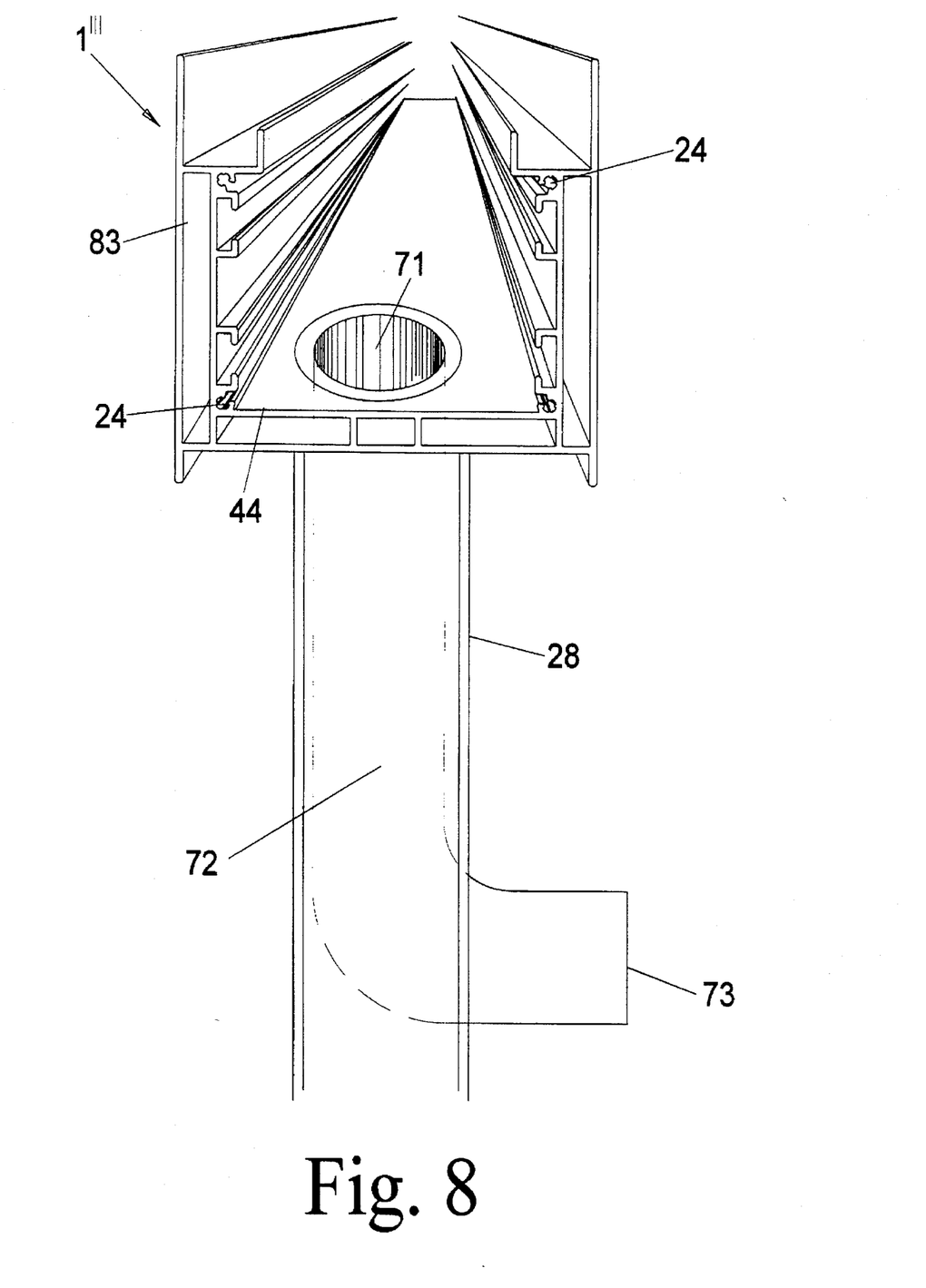
FIG. 8 is a simplified schematic perspective illustration of a structural member according to FIG. 7 for use as drain for rain water.

Structural members 1 which form the bordering of structures can be received in the receptacles 12 of structural members 1''' to downwardly confine a barrel arch or grid arch. Suitably, the structural members 1 are fitted in the receptacles 12 of structural members 1''' in such a manner that water draining via the respective arch flows via the longitudinal sides 16 into an interior space 70 surrounded by the side walls 42 and the bottom wall 44. The structural member 1 which forms the bordering of a glass panel or plastic panel 14 forming the grid arch or barrel arch is suitably sealed against the receptacle 12 so that water draining via the respective arch is prevented from reaching the receptacle 12 and directly flows into the interior space 70 from which water is conducted via a drain 71 as illustrated by way of example in FIG. 8. This drain 71 is provided in the bottom wall 44 of the structural member 1'''. The drain 71 is connected to a drainpipe 72 which extends downwards from the structural member 1''' and which may be guided e.g. within a downpipe or trough 28 extending vertically downwards from the drain 71. The drainpipe 72 is downwardly guided within the downpipe 28 and exits the downpipe 28 via a discharge conduit 33. Suitably, the downpipe 28 may serve simultaneously as support of the structural member 1'''.

Figure 9:
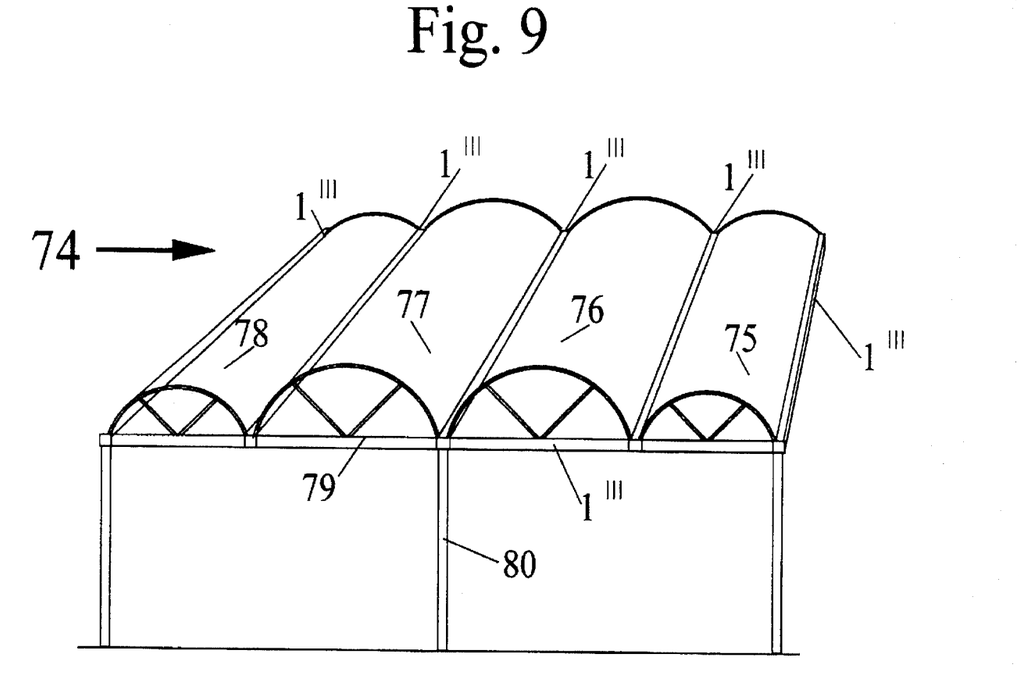
FIG. 9 is a simplified, schematic illustration of a structural member according to FIG. 7 for use in a roof construction in form of a barrel arch.

FIG. 9 shows a simplified schematic illustration of a structural member 1''' according to FIG. 7 for use in a roof construction in form of a barrel arch in which the structural member 1''' may extend between adjacent arches 75, 76, 77, 78. It is also possible to arrange a further structural member 1''' transversely to the longitudinal direction of the individual arches 75, 76, 77, 78 to form a support structure 79 for the structural members 1''' extending in longitudinal direction. At the same time, this support structure 79 may form a rain collector from which rain water may be drained via a collector 80 e.g. into a drain. A grid arch may be designed in similar manner.

The bordering-forming structural members 1 are secured in the receptacles 12 by screw fasteners 81 which traverse the longitudinal side 16 as shown in FIG. 7. The screw fasteners 81 may act as compressors by which the structural member 1 is retained within the receptacle 12 through force exerted by the screw fastener 82 onto the structural member 1. It is, however, also possible to drill a hole in the structural member 1 which is received in the receptacle 12 for engagement by the screw fastener 81.

Figure 10:
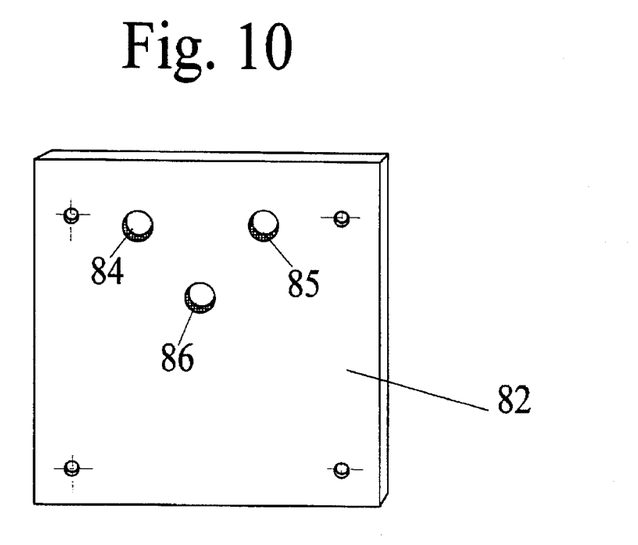
FIG. 10 is a plan view of an end plate which may be used for closing an open axial end of a structural member according to FIG. 7.

Extending in longitudinal direction of the structural member 1''' are chambers 24 which are preferably arranged in the corners 48 of the interior space 70 for receiving screws for attachment of an end plate 82 as shown in FIG. 10 to the end profile 83 (FIG. 8) of the structural member 1'''. The end plate 82 thus allows closing of an axial end of the interior space 70, with a seal (not shown) interposed between the end profile 83 and the end plate 82 and preferably arranged in a respective recess of the end plate 82. It is also possible to provide the end plate 82 with screw holes 84, 85, 86 which may be used to mount the structural member 1''' via the end plate 82 to a wall, with the structural member 1''' being attached transversely thereto.

Figure 11:
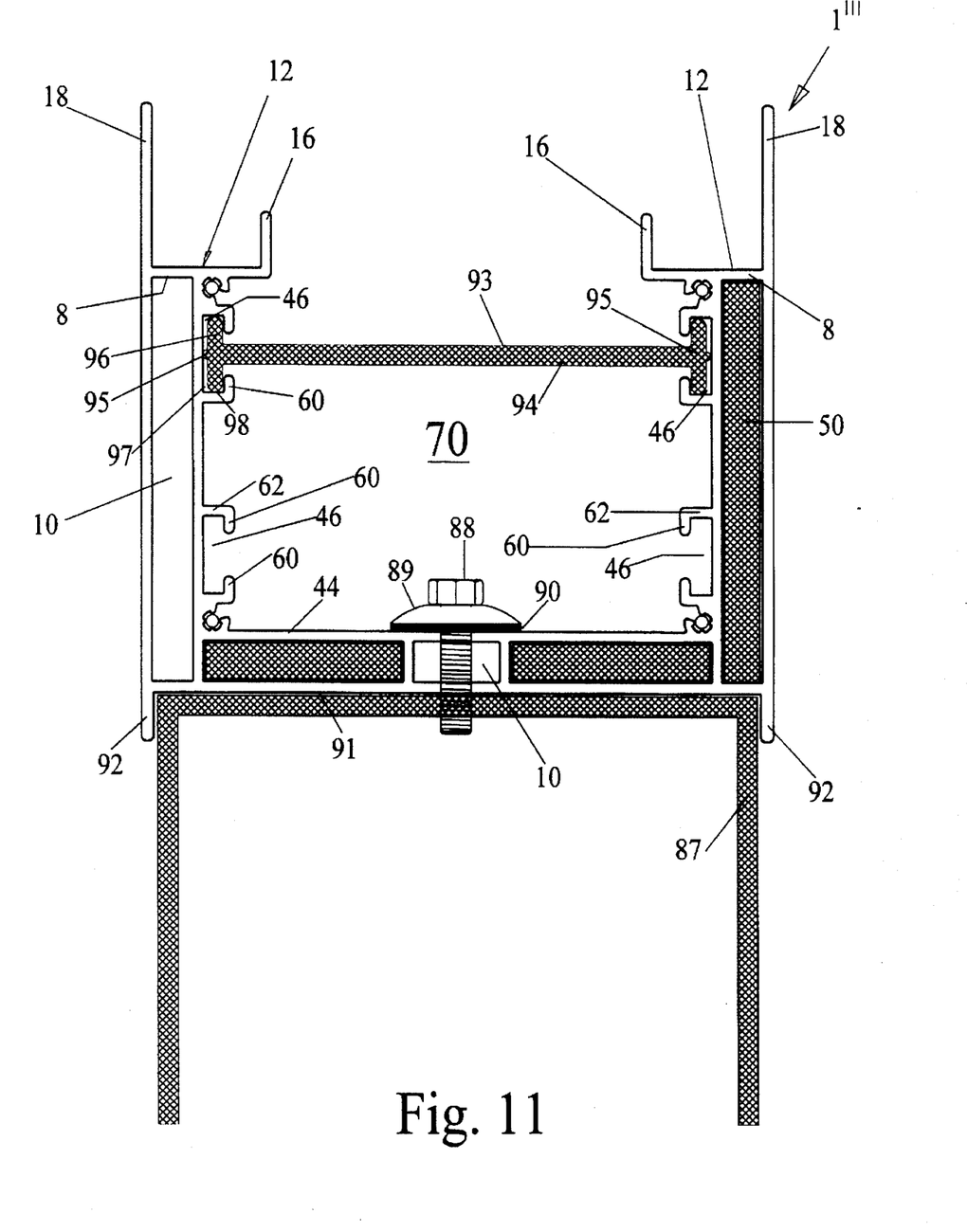
FIG. 11 is a cross-sectional view of a structural member according to FIG. 7, for mounting onto an exemplified support structure.

For joining structural members 1''' which are arranged sequentially in longitudinal direction with their end faces 39 abutting each other, connectors 50 are inserted from the end faces 39 into one or more hollow spaces 10, as shown in FIGS. 7 and 11. The connectors 50 are preferably made of steel or aluminum and have a cross section essentially in correspondence with the cross section of the hollow space 10 which in the nonlimiting example of FIG. 7 is of rectangular configuration. The connectors 50 are secured within the hollow spaces 10 by screw fasteners 52 which have a conical forward end 54 and are inserted in a threaded bore 56 of a clamping plate 58 previously inserted from the end face 39 into T-slotted guide sections 46 formed inwardly from the inside wall 2 of the side wall 42. When screwing the screw fasteners 52 into the threaded bores 56 of the clamping plate 58, the head of the screw fasteners 52 abut against the rectangularly bent free ends 60 of shanks 62 which form the T-slots 46 while the conical end 54 of the screw fastener 52 presses against the inside wall 2 of the side wall 42 so that the inside wall 2 which is preferably made of aluminum is pressed against the connector 50 to thereby push the connector 50 against the opposing inside surface of the outer wall 4 of the side wall 42. In this manner, the connector 50 is lockingly in the hollow space 10.

In order to improve the firmness and durability of the connection, the connector 50 may also be provided with apertures 34 in which the area of the inside wall 2 acted upon by the conical end of the screw fastener 52 is forced into during engagement by the screw fastener 52.

The bottom wall 44 may also accommodate connectors 50 in the hollow spaces 10 for butt-joining structural members 1''', with the connectors 50 being secured within the hollow spaces 10 in longitudinal direction e.g. by the end plate 82. It is, however, also feasible to secure the connectors 50 in the bottom wall 44 by means of screw fasteners in a same manner as the securement of the connector 50 in the side wall 42. In any event, the connectors 50 may also be made in angled configuration to allow a joining of a structural member 1''' in angled configuration with another structural member 1'''.

The structural member 1''' according to the invention is especially suitable as attachment onto support structures 87 which e.g. span a large space, with the structural member 1''' being mounted with its bottom wall 44 onto the support structure 87. For this purpose, the structural member 1''' is placed with its bottom wall 44 upon the support structure 87 and secured by a screw 88 which traverses e.g. the central hollow space 10 of the bottom wall 44 and enters the top of the support structure 87. Suitably, a seal 90 is sandwiched between the bottom wall 44 and the head 89 of the screw 88 in order to prevent rain water from penetrating through the screwed connection into the hollow space 10 or gaps 91 between the bottom wall 44 and the support structure 87. In order to ensure a precise guidance of the structural member 1''' upon the support structure 87, the inside wall of the side walls 42 extend beyond the bottom wall 44 to define legs 92 which overlap the support structure 87.

A dimensional stability of the structural member 1''' along a great length is ensured by installing a connecting web or cross connector 93 between opposing T-slots 46, as shown in FIG. 11. The connecting web 93 is made of a thin-walled sheet metal plate with a thickness not exceeding the distance between both free ends 60 of the shanks 62. The connecting web 93 extends across the entire interior space 70 and is guided along their longitudinal extremities 95 in opposing T-slots 46. For this purpose, the extremities 95 of the connecting web 93 includes crossbars 96 of a width approximately corresponding to the inside diameter of the T-slot 46. The provision of such crossbars 96 allows a guidance of the connecting web 93 in the T-slot 46. In order to avoid a tilting of the crossbars 96 during displacement of the connecting web 93 within the T-slots 46, the longitudinal edges 97 of the crossbars 96, running on the shanks 62, are provided with rounded ends 98 by which the crossbars 96 can easily slide within the T-slots 46.

The precise guidance of the cross bars 96 within the T-slot 46 and the accurate dimensioning of the connecting web 93 results in the stabilization of the upwardly open structural member 1'''. The connecting web 93 can extend along the entire length of the structural member 1'''. A stabilization is however also attained when placing a connecting web 93 in sections over the entire length of the structural member 1'''. Thus, a space remains between individual sections through which rain water entering the interior space 70 is drained in direction of the bottom wall 44. Moreover, these individual sections are sufficient to allow a walking upon the structural member 1''', e.g. for allowing an inspection. Finally, it is also possible to mount a lighting fixture or advertising board to the connecting web 93. Sections of a length of 10 cm in longitudinal direction of the structural member 1''' are sufficient for these purposes.

Suitably, the upper T-slots 46 are used for supporting the connecting web 93 to increase the stability and strength. The lower T-slots 46 can be used for installation of connectors 50.

The structural member 1''' according to the present invention has superior characteristics in context of constructions e.g. of roofs of any type for example for terraces and carports. Exhibition stands can be established with these structural members 1'" within a shod period through use of the structural member 1'" as support structure in vertical as well as horizontal direction. Moreover, the structural member 1'" is especially suitable for making showcases and display cases because of the ease to attach lamps or other lighting fixtures thereto. Moreover, the structural member 1'" can be easily used as space divider, especially as a mobile space divider because it allows an assembly within a very shod period. Finally, the structural member 1'" can also be easily arranged as a slidable display wall by mounting to the bottom wall 44 the guides for the slidable walls.

While the invention has been illustrated and described as embodied in an connector assembly for joining structural members, it is not intended to be limited to the details shown since various modifications and structural changes may be made without departing in any way from the spirit of the present invention.

What is claimed as new and desired to be protected by Letters Patent is set forth in the appended claims:

I claim:

1. A connector assembly comprising:
a plurality of structural members adapted for end-to-end and side-by-side dispositions, each of said structural members being formed by an outer wall which defines a hollow space and exhibiting at least one receptacle which adjoins said outer wall, wherein the receptacles of said structural members oppose each other in said side-by-side disposition of the structural members, with each said receptacle being formed of U-shaped configuration defined by opposing longitudinal sides and a base, with one of said longitudinal sides and said base being formed by a section of said outer wall and the other one of said longitudinal sides being formed by a cantilevered shank connected to said base; and
connecting means for joining the structural members, said connecting means including at least one single-piece first connector press-fitted in the opposing receptacles of the structural members.

2. The connector assembly as defined in claim 1 wherein said first connector is a massive block.

3. The connector assembly as defined in claim 1 wherein said first connector is of parallelepiped configuration.

4. The connector assembly as defined in claim 1 wherein said first connector is made of metal.

5. The connector assembly as defined in claim 4 wherein said first connector is made of aluminum.

6. The connector assembly as defined in claim 1 wherein a plurality of said first connectors is arranged over the entire length of said structural members.

7. The connector assembly as defined in claim 1 wherein said cantilevered shank bears upon said first connector under bending stress.

8. The connector assembly as defined in claim 1 wherein said cantilevered shanks of said opposing receptacles abut against each other with their free ends.

9. The connector assembly as defined in claim 1 wherein one of said longitudinal sides of each said receptacle has an inside surface facing said first connector and provided with a serration extending parallel in direction of the longitudinal axis of said structural member.

10. The connector assembly as defined in claim 1 wherein the hollow spaces of said structural members are aligned with each other in said end-to-side disposition, said connecting means further including a second connector engaging said aligned hollow spaces of said structural members.

11. The connector assembly as defined in claim 10 wherein said second connector is press fitted in said aligned hollow spaces of said structural members through deformation of at least one outer wall section adjoining said second connector.

12. The connector assembly as defined in claim 10 wherein said second connector includes at least one aperture for engagement by an impression provided in said outer wall from one side of one of said structural members.

13. The connector assembly as defined in claim 12 wherein said aperture is provided in an area of said second connector engaging between two opposing outer wall sections.

14. The connector assembly as defined in claim 13 wherein at least one of said outer wall sections bounds said receptacle.

15. The connector assembly as defined in claim 12 wherein said outer wall has an outside surface, said impression being formed without effecting a passageway that connects the outside surface of said outer wall with said hollow space.

16. The connector assembly as defined in claim 10 wherein said second connector is made of a flat material.

17. The connector assembly as defined in claim 16 wherein said second connector is made of flat steel.

18. The connector assembly as defined in claim 10 wherein said second connector includes two shanks joined at an angle to each other.

19. The connector assembly as defined in claim 10 wherein said second connector includes at least one aperture for engagement by opposing projections through impression on one of said structural members.

20. The connector assembly as defined in claim 1 wherein said each structural member is provided with opposing receiving chambers, at least one of said receiving chambers being defined at least on one side by an outer wall section forming said base of each said receptacle.

21. The connector assembly as defined in claim 1 wherein said outer wall is a single wall to enclose said hollow space.

22. A connector assembly comprising:
a plurality of structural members adapted for end-to-end and side-by-side dispositions, each structural member being formed by an outer wall which defines a hollow space and exhibiting at least one receptacle, with the receptacles being positioned such that the receptacle of a first structural member opposes the receptacle of a second structural member when the first structural member is positioned in said side-by-side disposition to the second structural member, and with the hollow spaces being positioned such that the hollow space of the first structural member aligns with the hollow space of a third structural member when the third structural member is positioned in said end-to-end disposition with the first structural member; and
connector means for joining the structural members, said connector means including at least a first connector press-fitted in the opposing receptacles of the first and second structural members, and a second connector received in the aligned hollow spaces of the first and third structural members;
wherein each of said structural members is provided with opposing receiving chambers formed inwardly from said outer wall and being open toward said hollow space for supporting said second connector, with each said receiving chamber being of essentially cross-shaped configuration, with a channel connected to said hollow space and bounded by two opposing projections.

23. A connector assembly comprising:

at least two structural members, each of said two structural members being formed by an outer wall which defines a hollow space, said two structural members being positioned in end-to-end disposition to align said hollow spaces with each other; and connecting means for joining said two structural members, said connecting means including a connector received in said aligned hollow spaces of said two structural members in said end-to-end disposition;

wherein said each structural member is provided with opposing receiving chambers formed inwardly from said outer wall and opened toward the hollow space, each of said receiving chambers being of essentially cross-shaped configuration with a channel connected to said hollow space and bounded by two opposing projections, said opposing receiving chambers of said each structural member supporting said connector therein to connect said two structural members in said end-to-end disposition.

24. The connector assembly as defined in claim 23 wherein said outer wall is a single wall to enclose said hollow space.

25. The connector assembly as defined in claim 23 wherein said connector includes at least one aperture for engagement by an impression provided in said outer wall from one side of one of said structural members.

26. The connector assembly as defined in claim 25 wherein said aperture is provided in an area of said connector engaging between two opposing outer wall sections.

27. The connector assembly as defined in claim 25 wherein said outer wall has an outside surface, said impression being provided without forming a passageway from the outside surface of said outer wall into said hollow space.

28. The connector assembly as defined in claim 23 wherein said connector includes at least one aperture for engagement by said opposing projections through impression.

29. The connector assembly as defined in claim 23 wherein at least one of said receiving chambers is defined at least on one side by an outer wall section forming a base of a receptacle.

\* \* \* \* \*